(12) United States Patent
Drell et al.

(10) Patent No.: US 7,450,149 B2
(45) Date of Patent: Nov. 11, 2008

(54) CONFERENCING SYSTEM WITH INTEGRATED AUDIO DRIVER AND NETWORK INTERFACE DEVICE

(75) Inventors: David Drell, Austin, TX (US); Richard Washington, Marble Falls, TX (US)

(73) Assignee: Polycom, Inc., Pleasanton, CA (US)

( * ) Notice: Subject to any disclaimer, the term of this patent is extended or adjusted under 35 U.S.C. 154(b) by 299 days.

(21) Appl. No.: 10/396,976

(22) Filed: Mar. 24, 2003

(65) Prior Publication Data

US 2004/0012669 A1    Jan. 22, 2004

Related U.S. Application Data

(60) Provisional application No. 60/372,888, filed on Apr. 15, 2002, provisional application No. 60/367,475, filed on Mar. 25, 2002.

(51) Int. Cl.
*H04N 7/14* (2006.01)
*H04R 1/02* (2006.01)

(52) U.S. Cl. .............. 348/14.08; 348/14.12; 348/14.13; 370/260

(58) Field of Classification Search ... 348/14.01–14.09, 348/14.1, 14.11, 14.12, 14.13, 14.16; 370/260, 370/261; 809/204; 361/683, 309; 381/386, 381/87
See application file for complete search history.

(56) References Cited

U.S. PATENT DOCUMENTS

| | | | | |
|---|---|---|---|---|
| 5,335,011 | A * | 8/1994 | Addeo et al. | 348/14.1 |
| 5,367,621 | A * | 11/1994 | Cohen et al. | 715/501.1 |
| 5,528,285 | A * | 6/1996 | Morikawa et al. | 348/14.01 |
| 5,949,853 | A * | 9/1999 | Resnick | 379/67.1 |
| 6,072,522 | A * | 6/2000 | Ippolito et al. | 348/14.1 |
| 6,128,033 | A * | 10/2000 | Friedel et al. | 348/14.04 |
| 6,243,260 | B1 * | 6/2001 | Lundgren et al. | 361/683 |
| 6,402,556 | B1 * | 6/2002 | Lang et al. | 439/632 |
| 6,414,707 | B1 * | 7/2002 | Agraharam et al. | 348/14.07 |
| 6,690,307 | B2 * | 2/2004 | Karczewicz | 341/67 |
| 6,731,334 | B1 * | 5/2004 | Maeng et al. | 348/211.12 |
| 6,847,403 | B1 * | 1/2005 | Forsberg et al. | 348/373 |
| 6,882,335 | B2 * | 4/2005 | Saarinen | 345/156 |
| 7,016,402 | B2 * | 3/2006 | Sherlock | 375/222 |
| 2001/0042114 | A1 * | 11/2001 | Agraharam et al. | 709/223 |
| 2002/0083462 | A1 * | 6/2002 | Arnott | 725/100 |
| 2002/0149672 | A1 * | 10/2002 | Clapp et al. | 348/14.09 |

FOREIGN PATENT DOCUMENTS

| | | | | |
|---|---|---|---|---|
| JP | 406062318 | A | * | 3/1994 |
| JP | 406351010 | A | * | 12/1994 |
| JP | 408065645 | A | * | 3/1996 |
| JP | 10-145765 | | * | 5/1998 |

* cited by examiner

*Primary Examiner*—Melur Ramakrishnaiah
(74) *Attorney, Agent, or Firm*—Wong, Cabello, Lutsch, Rutherford, & Brucculeri, LLP

(57) ABSTRACT

A conferencing system with improved audio response, interface, and audio source tracking capabilities includes a low-profile base unit capable of capturing and processing audio and video information and of interfacing with other external devices, and a separate network interface device coupled to the low-profile base unit and capable of connecting to a network, producing audible sound, regulating power, and housing removable interface circuitry.

19 Claims, 2 Drawing Sheets

CONFERENCING SYSTEM WITH INTEGRATED AUDIO DRIVER AND NETWORK INTERFACE DEVICE

CROSS REFERENCE TO RELATED APPLICATIONS

This application claims the benefit of U.S. Provisional Application No. 60/367,475, filed Mar. 25, 2002. Additionally, the present application is related to commonly owned U.S. Patent Application No. 60/372,888, entitled "Videoconferencing System With Horizontal and Vertical Microphone Arrays For Enhanced Source Locating and Camera Tracking" filed on Apr. 15, 2002, which is incorporated herein by reference.

BACKGROUND

1. Field of the Invention

The present invention relates generally to communications equipment, and more particularly to a conferencing system with an integrated network interface device.

2. Description of the Prior Art

Audio, video, and data conferencing systems have become an increasingly popular and valuable business communications tool. Conferencing systems facilitate natural communication between persons or groups of persons situated remotely from each other, thus streamlining the communication and decision-making process, and obviating the need for expensive and time-consuming business travel.

Generally, prior conferencing systems suffer from disadvantages due to the ever-present design conflict between size and capability. Since videoconferencing systems in particular are, typically, physically located atop a display monitor, users demand space efficient systems which are not too large or cumbersome to operate in such a configuration. Furthermore, the demand for operational capabilities of videoconferencing systems is also increasing (e.g., users desire higher quality video and audio input/output and more network flexibility).

Prior conferencing devices and systems, typically, are limited in their audio output frequency response, partly due to size constraints affecting their design. Furthermore, prior systems have limited interface capabilities with respect to peripheral devices and communication networks. Still further, prior systems are limited in their ability to accurately locate the conference speaker and to track the camera to an audio source (e.g., the conference speaker).

SUMMARY

The present invention includes a videoconferencing system comprising a low-profile base unit including at least one capture device, such as a microphone or camera, for capturing local audio and/or video, and a network-connected network interface device for receiving audio and video signals from a remote conference endpoint. Additionally, the low-profile base unit contains a network connection such as a connection to a LAN.

The low-profile base unit includes interface circuitry for receiving audio and video signals from local external devices, and a processor to process local and remote signals and to effect reproduction of information represented by the local and remote signals on at least one local output device such as a speaker or display monitor. The network interface device includes an audio driver to present audio information represented by the remote signals from the remote conference endpoint, a power supply for regulating power for the videoconferencing system, and a housing configured to contain a removable network interface circuit. The conferencing system is additionally operative to receive audio signals from external microphone arrays for processing in order to execute complex algorithms for audio source location determination.

In one embodiment of the present invention, the low-profile base unit provides support for exchanging information with peripheral devices or networks via wireless communication technologies such as BlueTooth™. Alternative embodiments may employ a low-profile base unit with an audio driver for reproducing audio information represented by the remote signals from the remote conference endpoint, preferably in a manner causing conference participants to direct their visual attention to the low-profile base unit.

In a further embodiment of the present invention, the network interface device housing is utilized to contain removable digital network interface circuitry, such as a quad ISDN (Integrated Services Digital Network) card. In an exemplary embodiment, the network interface circuitry is modular allowing for user configuration and selection of quad ISDN, PRI, V.35, etc.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION OF EXEMPLARY EMBODIMENTS

A conferencing system with an integrated audio driver and network interface device is described. In the following description, for the purposes of explanation, numerous specific details are set forth in order to provide a thorough understanding of the present invention and implementation thereof. It will be apparent, however, to one skilled in the art that the present invention may be practiced without these specific details. In other instances, well-known structures and devices are shown in block diagram form in order to avoid unnecessarily obscuring the present invention.

Figure 1:
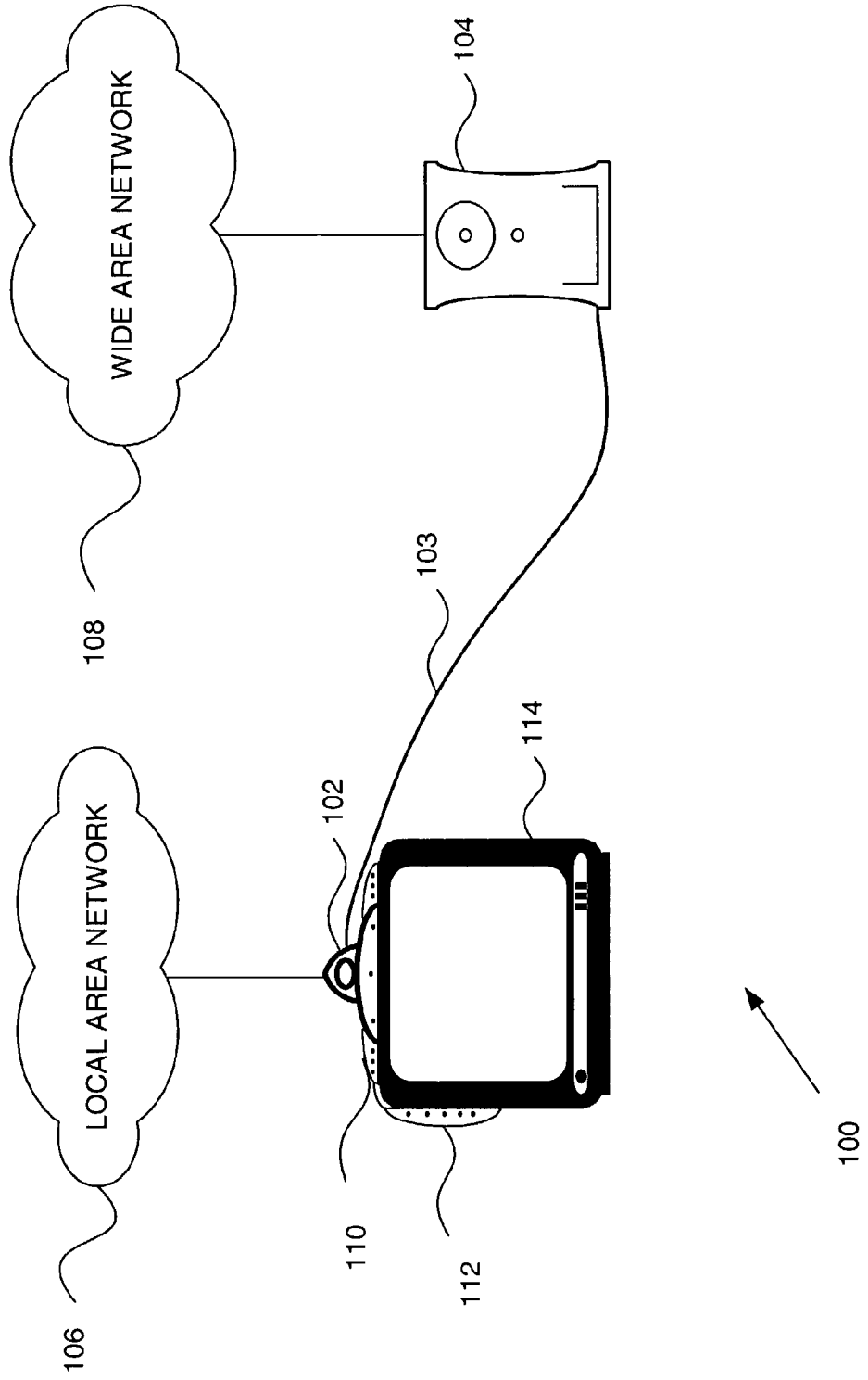
FIG. 1 depicts an exemplary configuration and operating environment of a conferencing system with an integrated network interface device according to the present invention.

FIG. 1 depicts an exemplary configuration and operating environment of a conferencing system 100. In one embodiment of the present invention, components of conferencing system 100 include, but are not limited to, a network interface device 104 and a low-profile base unit 102. In this embodiment, the conferencing system 100 is a videoconferencing system. Alternatively, the conferencing system may be an audio conferencing system, a data conferencing system, etc.

The low-profile base unit 102 is electrically coupled by an interconnect cable 103 to the network interface device 104. The architecture of the low-profile base unit 102 and the network interface device 104 are explained in more detail with reference to FIG. 2.

The low-profile base unit 102 is further coupled through a network interface unit (see 248 of FIG. 2)) to a network, such as a local area network (LAN) 106, to provide communication between the conference system 100 and other local devices present on nodes of the LAN 106. The LAN 106 may utilize technology, such as Ethernet or other suitable technologies, for communication between the connected devices. The connected devices may communicate via an appropriate standard such as the International Telecommunications Union (ITU) H.323 standard for videoconferencing over IP-based networks, and via an appropriate protocol, such as Transmission Control Protocol/Internet Protocol (TCP/IP). Those skilled in the art will recognize that the usefulness of the technology described herein is not limited to use with an operating environment as depicted in FIG. 1 and that it can be utilized in any number of environments and implementations. For example, an alternative arrangement may provide the network interface device 104, instead of the low-profile base unit 102, coupled to the LAN 106, and still fall within the scope of the present invention.

In addition, the network interface device 104 may be connected to a network, such as a wide area network (WAN) 108 (e.g., the Internet or a public switched telephone network (PSTN)). The WAN 108 enables the network interface device 104, and thus the connected low-profile base unit 102, to communicate with other devices or remote endpoints connected to or in communication with the WAN 108. The devices on the WAN 108 are capable of communicating with each other through appropriate transmission protocols, for example, the ITU H.320 series of standards for Integrated Services Digital Networks (ISDN) and/or the ITU H.323 standard for IP-based networks. Again, an alternative embodiment may provide the low-profile base unit 102 instead of the network interface device 104 connected to the WAN 108, and still fall within the scope of the invention. In yet another embodiment, the WAN 108 may communicate through an ITU H.324 standard for PSTN.

In an exemplary embodiment of the present invention, the conferencing system 100 is optionally provided with a horizontal microphone array (HMA) 110 and a vertical microphone array (VMA) 112 which are electrically and mechanically coupled to the low-profile base unit 102. Alternatively, the VMA 112 may be electrically coupled to the low-profile base unit 102 through direct electrical and mechanical coupling with the HMA 110. The HMA 110 physically interfaces with a display monitor 114 in a substantially horizontal position and includes a plurality of microphones for capturing local audio from an audio source for conversion to audio signals. Similarly, the VMA 112 physically interfaces with the display monitor 114 in a substantially vertical position and also includes a plurality of microphones for capturing local audio from the audio source. In another embodiment, the VMA 112 can provide vertical positioning of the audio source without physically being attached to the low-profile base unit 102, and audio-level sensors can be used to provide required correlation.

The captured local audio, whether captured solely by the low-profile base unit 102, by the low-profile base unit 102 in conjunction with the HMA 110 and/or VMA 112, or by an external microphone unit (not shown), is transmitted to and processed by a processor (not shown). The external microphone unit itself may contain a plurality of microphones. The processor may reside in the network interface device 104 or in the low-profile base unit 102, and operates to include execution of at least one algorithm for determining a position of an audio source. The calculated position of the audio source may in turn be utilized for camera tracking (i.e., to control and position an image capture device; see 242 of FIG. 2) to capture an image of the audio source. In another embodiment, visual feedback may be used in conjunction with the VMA 110 for fine-tuning a tilt angle of a camera or similar video capture device for voice tracking.

Figure 2:
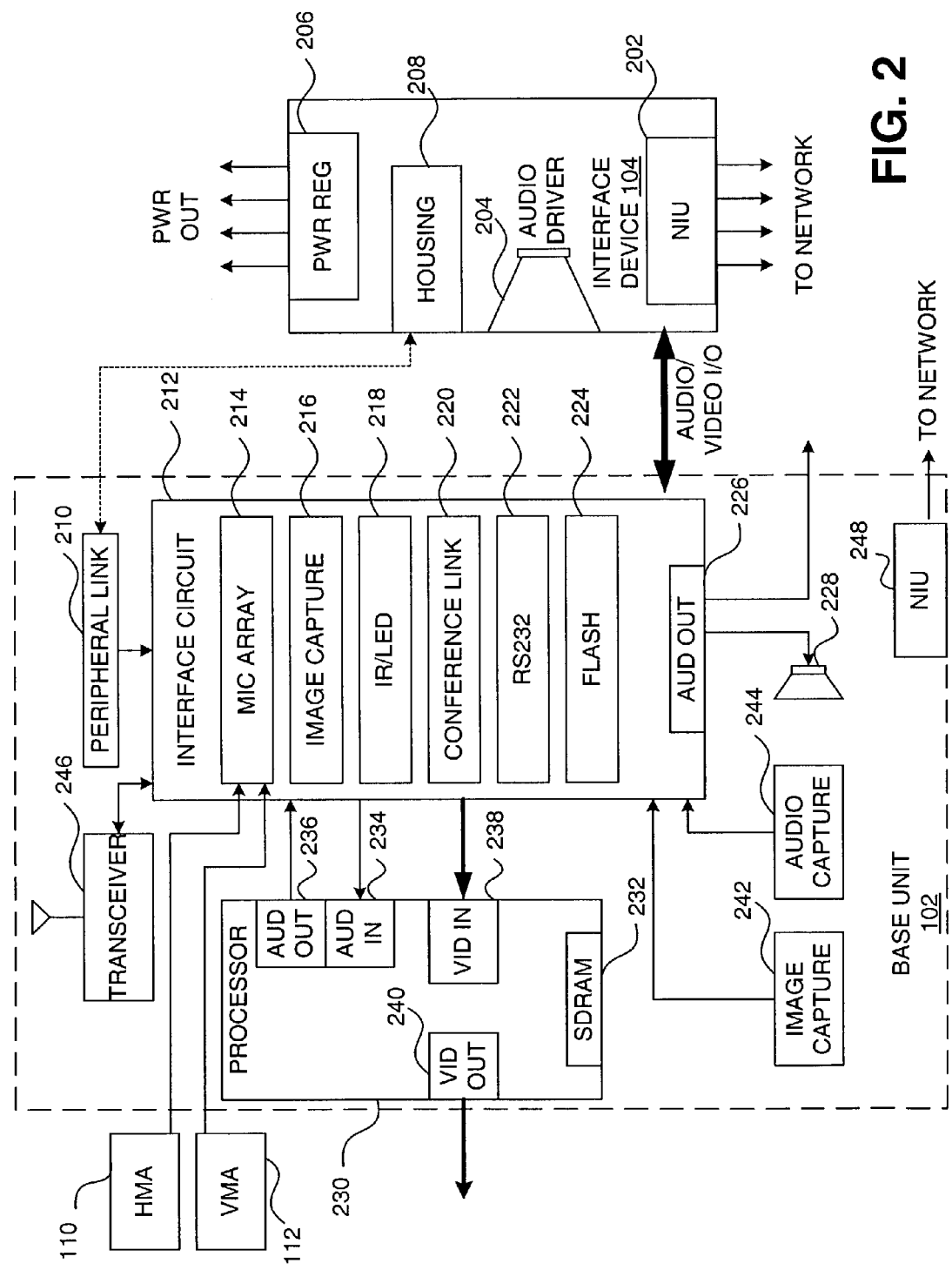
FIG. 2 is an exemplary block diagram depicting the architecture of a conferencing system low-profile base unit and network interface device according to the present invention.

FIG. 2 is a block diagram depicting an exemplary architecture of the low-profile base unit 102 and the network interface device 104. As shown, the network interface device 104 is provided with a network interface unit (NIU) 202 such as a modem, an Ethernet card, or the like, to enable communication with one or more devices over the WAN 108 (FIG. 1), the LAN 106 (FIG. 1), or any other type of network. The network interface device 104 may, alternatively, be provided with a plurality of network interface units 202 for communicating with a plurality of different networks.

As discussed above, the conferencing system 100 (FIG. 1) preferably communicates with other devices or remote endpoints via the network interface unit 202 of the network interface device 104. Alternatively, the conferencing system 100 is capable of communicating with other conferencing systems or other devices via a comparable network interface unit 248 (e.g., a modem, an Ethernet card, or the like) provided in the low-profile base unit 102.

The network interface device 104 is further provided with an audio driver 204, for example, a bass audio driver, for presenting audible sound typically representative of an audio portion of a conference received from a remote conference endpoint (not shown). The audio driver 204 is capable of conventionally converting audio signals to audible sound for presentation to conference participants. In one embodiment, the audio driver 204 is capable of reproducing audible frequencies typically associated with sub-woofers, and has a frequency response that includes frequencies down to a frequency of approximately 80 Hertz or lower within 3 decibels of a mid-range audible frequency response. Furthermore, this extended frequency response is provided while maintaining the low-profile base unit 102 since the audio driver 204 is located separate from the low-profile base unit 102. Typically, the low-profile base unit 102 physically interfaces with (i.e., is placed on top of) the display monitor 114 (FIG. 1). This conferencing system 100 configuration provides an additional advantage by reducing the number of component parts in the low-profile base unit 102 while enhancing the functionality of the overall conferencing system 100, including extended frequency response, extended network interface capability, enhanced source location and camera tracking, and psycho-acoustic effects.

The network interface device 104 is further provided with a power regulator 206 for regulating and supplying power obtained from an external source to the components of conferencing system 100. The network interface device 104 is provided with at least one housing 208 (or "slot"), which functions to house and interface with various removable peripheral interfacing cards, such as network interface circuits (or "cards"). The housing 208 may employ proprietary interconnection architecture or a standard architecture, such as ISA (Industry Standard Architecture), PCI (Peripheral Component Interconnect), or a USB (Universal Serial Bus) interface.

The housing 208 provides scalability to the conferencing system 100 by providing an interface mechanism for communicating with a plurality of peripheral devices and networks. Furthermore, the housing 208 facilitates communication between installed cards or other interface links and a low-profile base unit interface circuit 212 via a peripheral link 210. For example, one embodiment of the present invention utilizes IP (Internet Protocol) for communication over IP networks. In one exemplary embodiment, the LAN 106 connection located in the low-profile base unit 102 does not travel over any proprietary peripheral link. Such an embodiment can be extended to additionally utilize other protocols or standards for communication over various types of networks.

Continuing with the example, a quad ISDN card can be installed in the housing 208, thus providing up to four ISDN connections for high-speed applications over the PSTN.

Other examples of interface circuitry include a card for supporting the 802.11 family of specifications (developed by the IEEE) for wireless LAN technology, a card for capturing data from an electronic whiteboard, a card for supporting the ITU V.35 standard for high-speed synchronous data exchange, and cards or interfaces for supporting other communication technologies for peripheral devices such as personal digital assistants (PDA) or other hand-held electronic devices. Implementation of the latter would provide capability for conferencing system 100 users to initiate a conference call through their PDA's and an associated directory of the PDA.

One embodiment of the low-profile base unit 102 comprises the interface circuit 212 and a processor 230, in addition to an audio driver 228, an image capture device 242, audio capture device 244, a wireless interface transceiver 246, and a network interface unit 248. The previously discussed peripheral link 210 facilitates communication between peripheral devices and the low-profile base unit 102 via the network interface device 104, and communicates with the interface circuit 212.

The interface circuit 212 provides command and control functionality and signal throughput between the low-profile base unit 102 and a plurality of external devices. In one embodiment, a field programmable gate array (FPGA) may be used as the interface circuit 212. One exemplary embodiment of the interface circuit 212 includes a microphone array interface 214, an image capture interface 216, an IR/LED interface 218, a conference link interface 220, an RS-232 serial link interface 222, and a flash memory 224. The microphone array interface 214 operates to support communication with the HMA 110 and the VMA 112. The image capture interface 216 operates to support communication with an image capture device 242, such as a digital video camera or an internal CMOS or CCD image sensor. Further, the IR/LED interface 218 operates to support bi-directional communication with devices, such as a remote control, that utilize infrared (IR), ultraviolet (UV), or other wavelengths of light from a light-emitting diode (LED) or other device for data transmission. In one embodiment, the conferencing system 100 is capable of sending data to the remote control to allow for highlighting of remote control buttons based on availability of an action (e.g., indicating which presets are available, which farside camera is active, etc.).

Additionally, the conference link 220 supports transmission of conference audio, video, and/or data information that is received from an external peripheral conference device, such as a speakerphone or graphics interface device, to the conference system 100, the LAN 106, and/or the WAN 108. The standard RS-232 serial link interface 222 is provided for serial transmission of data from the peripheral device to the low-profile base unit 102, while the flash memory 224 is provided for storing data or executable programs such as the conferencing system 100 operating system. Finally, the interface circuit 212 comprises an interface audio-out port 226 and associated circuitry for transmission of audio signals to the low-profile base unit audio driver 228 and to an externally connected audio device (not shown) if the system is so configured.

In one embodiment, the audio driver 228 is configured to reproduce the mid-range and high-end of the frequency spectrum, whereas the low- or bassend (e.g., a frequency of approximately 80 Hz or lower) is reproduced by the audio driver 204 of the network interface device 104. The combination of the audio drivers 204 and 228 provide the conferencing system 100 with an improved frequency response. Furthermore, in one embodiment of the present invention, the audio signals are processed by the processor 230 such that a psycho-acoustic effect is generated to direct a conference participant's attention generally to the location of the audio driver 228. Because the audio driver 228 is located proximal to the image capture device 242, the participant will instinctively look towards the audio driver 228 and thus the image capture device 242. One method for creating this effect is to delay the signal to the bass audio driver 204 in relation to the signal to the audio driver 228, thus taking advantage of the HAAS Effect (or the principle of first arrival) to effect a listener's sound locating function.

Processor 230 may also include signal processing for purposes of canceling out speaker feedback signals, as well as for canceling out camera noise signals. Additional capabilities provided by the processor 230 include analog-to-digital conversion and compression of local audio and video signals as well as decompression and digital-to-analog conversion of remote audio and video signals.

Further attention is directed to the processor 230, which comprises a memory 232. In one embodiment, the memory 232 is synchronous dynamic random access memory (SDRAM). However, one skilled in the art will recognize that other types or volatile and/or non-volatile memory may be used. The memory 232 is provided for storage of and access to data required by the processor 230 during execution of various audio, video, and data signal processing routines. A processor audio-in port 234 and processor audio-out port 236 and associated circuitry (not shown) are provided for transmission of audio signals between the processor 230 and the interface circuit 212. Further, the processor video-in port 238 and processor video-out port 240 and associated circuitry are provided for transmission of video signals from the interface circuit 212 to the processor 230 and from the processor 230 to an external device such as the display monitor 114 (FIG. 1).

The image capture device 242 is, for example, a video camera, a CMOS image sensor, or a CCD array. Image capture device 242 is provided to capture local activity occurring within the image capture device 242 view and range, and to convert the captured local activity images to video signals. The local activity is typically actions of the conference participants at the local endpoint. Images captured by the image capture device 242 are transmitted to the processor 230 for processing thereof via the interface circuit 212. Additionally, multiplexed audio/video signals are delivered to one of the network interface units 202 or 248 for transmission to other network-connected conference endpoints.

The audio capture device 244, for example, a microphone, is provided to capture local audio activity within the audio capture device 244 pick-up range, and convert the local audio activity to electrical signals. The local audio activity is typically conversation of the conference participants at the local endpoint. The audio activity captured by the audio capture device 244 is then transmitted to the processor 230 for processing thereof via the interface circuit 212. The processor audio-out port 236 facilitates transmission of the processed audio to the interface circuit 212 for subsequent transmission to the audio driver 228 or an external audio driver, through the interface audio out port 226. Additionally, a portion of the audio information may be delivered to the audio driver 204 of the network interface device 104 for playback as described above, and multiplexed audio/video signals may also be delivered to one of the network interface units 202 or 248 for transmission to other network-connected conference endpoints.

A wireless interface transceiver 246 is provided for communicating with external wireless communication devices, for example, a mobile phone, personal digital assistant, or other portable electronic devices that are enabled with wireless technology such as that described in the BlueTooth™ specification (developed by Telefonaktiebolaget L M Ericsson of Stockholm, Sweden). Alternatively, other wireless communication devices are contemplated by the present invention. Configuring the conferencing system 100 (FIG. 1) with the wireless interface transceiver 246 provides the capability, for example, of allowing users to initiate a conference call through their wireless devices. The transceiver 246 offers the additional capability of using a wireless headset (not shown), enabled with the appropriate communication technology, thus providing a conference participant mobility within an associated range of the equipment (i.e., the transceiver 246 and the headset). Further, the transceiver 246 may be configured as separate components (i.e., a transmitter and a receiver) and still be within the intended scope of the present invention. Finally, the network interface unit 248 is provided for communicating with other devices connected through a network such as the LAN 106 or the WAN 108 as previously described.

It is noted that additional conventional components may be present in the conference system 100 (FIG. 1) which are not shown in FIG. 2. The following are non-limiting examples of additional conventional components, provided for exemplary purposes. For example, amplifiers for amplifying the audio signals delivered to audio drivers 204 and 228 may be contained in either or both the low-profile base unit 102 and the network interface device 104. Additionally, audio codecs for converting audio signals from analog to digital format and then compressing the audio signals and decompressing and transforming the audio signals from digital to analog format may be included in either the low-profile base unit 102 or the network interface device 104. Video codecs for encoding/compressing and decoding/decompressing video signal streams, and a MUX/DEMUX for multiplexing and demultiplexing audio, video, and data signals onto a carrier channel in the form of a complex signal may also be included in either the low-profile base unit 102 or the network interface device 104. It is further noted that an amplifier (not shown) for the audio driver 204 may optionally be located within the network interface device 104 to limit the amount of heat that is generated in the low-profile base unit 102, and for facilitating the maintenance of a small, low-profile base unit 102.

In the foregoing specification, the present invention is described with reference to exemplary embodiments thereof. It will be recognized by those skilled in the art that while the invention is described above in terms of exemplary embodiments, it is not limited thereto. Various features and aspects of the above-described invention may be used individually or jointly. Further, although the present invention has been described in the context of its implementation in a particular environment and for particular applications, those skilled in the art will recognize that its usefulness is not limited thereto and that it can be utilized in any number of environments and applications without departing from the broader spirit and scope thereof. The specification and drawings are, accordingly, to be regarded in an illustrative rather than a restrictive sense.

What is claimed is:

1. A conferencing system comprising:
   a base unit, the base unit comprising:
   at least one audio driver; and
   an audio capture device; and
   an interface device separate from and communicatively coupled to the base unit via an interconnect cable, the interface device comprising:
   at least one network interface unit configured to receive information via a network from a remote conferencing device; and
   a power regulator configured to supply power from an external source to the conferencing system.

2. The conferencing system of claim 1 wherein the network is selected from the group consisting of: a local area network, a wide area network, the Internet, and a public switched telephone network.

3. The conferencing system of claim 2 wherein the base unit further comprises a processor configured to perform at least one of:
   decoding the information received by the at least one network interface unit from the remote conferencing device; and
   encoding audio information captured by the audio capture device for transmission by the at least one network interface unit to the remote conferencing device via the network.

4. The conferencing system of claim 2 wherein the interface device further comprises a processor configured to perform at least one of:
   decoding the information received by the at least one network interface unit from the remote conferencing device; and
   encoding audio information captured by the audio capture device for transmission by the at least one network interface unit to the remote conferencing device via the network.

5. The conferencing system of claim 2 wherein the interface device further comprises an additional audio driver configured to reproduce at least a portion of audio information received from the remote conferencing device.

6. The conferencing system of claim 5 wherein the additional audio driver is a subwoofer.

7. The conferencing system of claim 2 wherein the interface device further comprises a housing configured to accept one or more removable peripheral interface cards.

8. The conferencing system of claim 7 wherein the one or more removable peripheral interface cards comprise one or more ISDN interface cards.

9. A conferencing system comprising:
   a base unit, the base unit comprising:
   at least one audio driver;
   an audio capture device; and
   an image capture device; and
   an interface device separate from and communicatively coupled to the base unit via an interconnect cable, the interface device comprising:
   at least one network interface unit configured to receive information from a remote conferencing device via a network; and
   a power regulator configured to supply power from an external source to the conferencing system.

10. The conferencing system of claim 9 wherein the network is selected from the group consisting of: a local area network, a wide area network, the Internet, and a public switched telephone network.

11. The conferencing system of claim 10 wherein the base unit further comprises a processor configured to perform at least one of:
   decoding the information received by the at least one network interface unit from the remote conferencing device via the network; and encoding audio information captured by the audio capture device and video information captured by the image capture device for transmission by the at least one network interface unit to the remote conferencing device via the network.

12. The conferencing system of claim 10 wherein the interface device further comprises a processor configured to perform at least one of:

decoding the information received by the at least one network interface unit from the remote conferencing device via the network; and encoding audio information captured by the audio capture device and video information captured by the image capture device for transmission by the at least one network interface unit to the remote conferencing device via the network.

13. The conferencing system of claim 10 wherein the interface device further comprises an additional audio driver configured to reproduce at least a portion of audio information received from the remote conferencing device.

14. The conferencing system of claim 13 wherein the additional audio driver is a subwoofer.

15. The conferencing system of claim 10 wherein the interface device further comprises a housing configured to accept one or more removable peripheral interface cards.

16. The conferencing system of claim 15 wherein the one or more removable peripheral interface cards comprise one or more ISDN interface cards.

17. The conferencing system of claim 9 further comprising a horizontal microphone array coupled to the base unit.

18. The conferencing system of claim 9 further comprising a vertical microphone array coupled to the base unit.

19. The conferencing system of claim 17 further comprising a vertical microphone array coupled to the base unit.

* * * * *